(12) United States Patent
Pinder

(10) Patent No.: US 7,130,665 B2
(45) Date of Patent: Oct. 31, 2006

(54) METHOD AND APPARATUS TO ENSURE INTRINSICALLY SAFE OPERATION OF A COMMUNICATION DEVICE

(75) Inventor: Ellis A. Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 196 days.

(21) Appl. No.: 10/649,445

(22) Filed: Aug. 26, 2003

(65) Prior Publication Data

US 2005/0049010 A1    Mar. 3, 2005

(51) Int. Cl.
*H04Q 7/20* (2006.01)
(52) U.S. Cl. .................. 455/572; 455/557; 455/418
(58) Field of Classification Search ............ 455/572, 455/418, 410, 411, 557
See application file for complete search history.

(56) References Cited

U.S. PATENT DOCUMENTS 5,450,613 A * 9/1995 Takahara et al. ............ 455/517
6,164,547 A * 12/2000 Vapaakoski et al. ........ 235/474
6,272,560 B1 * 8/2001 Kenton et al. ................. 710/8
6,725,061 B1 * 4/2004 Hutchison et al. .......... 455/557
2004/0192274 A1 * 9/2004 Vuori .......................... 455/418

* cited by examiner

*Primary Examiner*—Erika A. Gary
(74) *Attorney, Agent, or Firm*—Barbara R. Doutre

(57) ABSTRACT

Intrinsically safe operation (100, 200) of a communication device (202) and a peripheral device (204) coupled thereto is provided. By storing communication device type certification parameters within the communication device (202) and storing peripheral device type certification parameters within the peripheral device (204), the communication device can determine (110) whether the peripheral device is intrinsically compatible (108) with the communication device and restrict operation (114, 116, 118) of either device as needed.

18 Claims, 2 Drawing Sheets

METHOD AND APPARATUS TO ENSURE INTRINSICALLY SAFE OPERATION OF A COMMUNICATION DEVICE

TECHNICAL FIELD

This invention relates in general to communication devices, and more particularly to the intrinsically safe operation of communication devices.

BACKGROUND

Two-way radios, cell phones, and other handheld communication devices are often used in flammable or potentially explosive areas. Radios intended for hazardous or potentially explosive environments must receive "intrinsically safe" type certification through an agency such as Factory Mutual (FM) or be Atmosphere Exposive (ATEX) certified in the European Union. This certification also extends to batteries and accessories. It is common for handheld communication devices, batteries, and accessories to be available in both type-certified and non-certified versions. To simplify product design and development costs, it is common for both versions of a given device to be substantially similar. This creates a potential problem: type certification of a portable communication device can only be assured if the radio, battery, and all attached accessories have an equivalent certification. It is probable that a user could assemble a portable communication device using both type-certified and non-certified components. For example, a Factory Mutual (FM) approved radio may be mated to a mechanically and electrically compatible radio battery that is not FM-approved. Such a configuration puts the user at risk, and the user may not even be aware that an improper configuration has been put together. It would therefore be desirable to limit non-approved battery, accessory, or other peripherals from operating with an approved communication device.

Accordingly, there is a need to ensure intrinsically safe operation of a communication device with peripheral devices that couple thereto.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
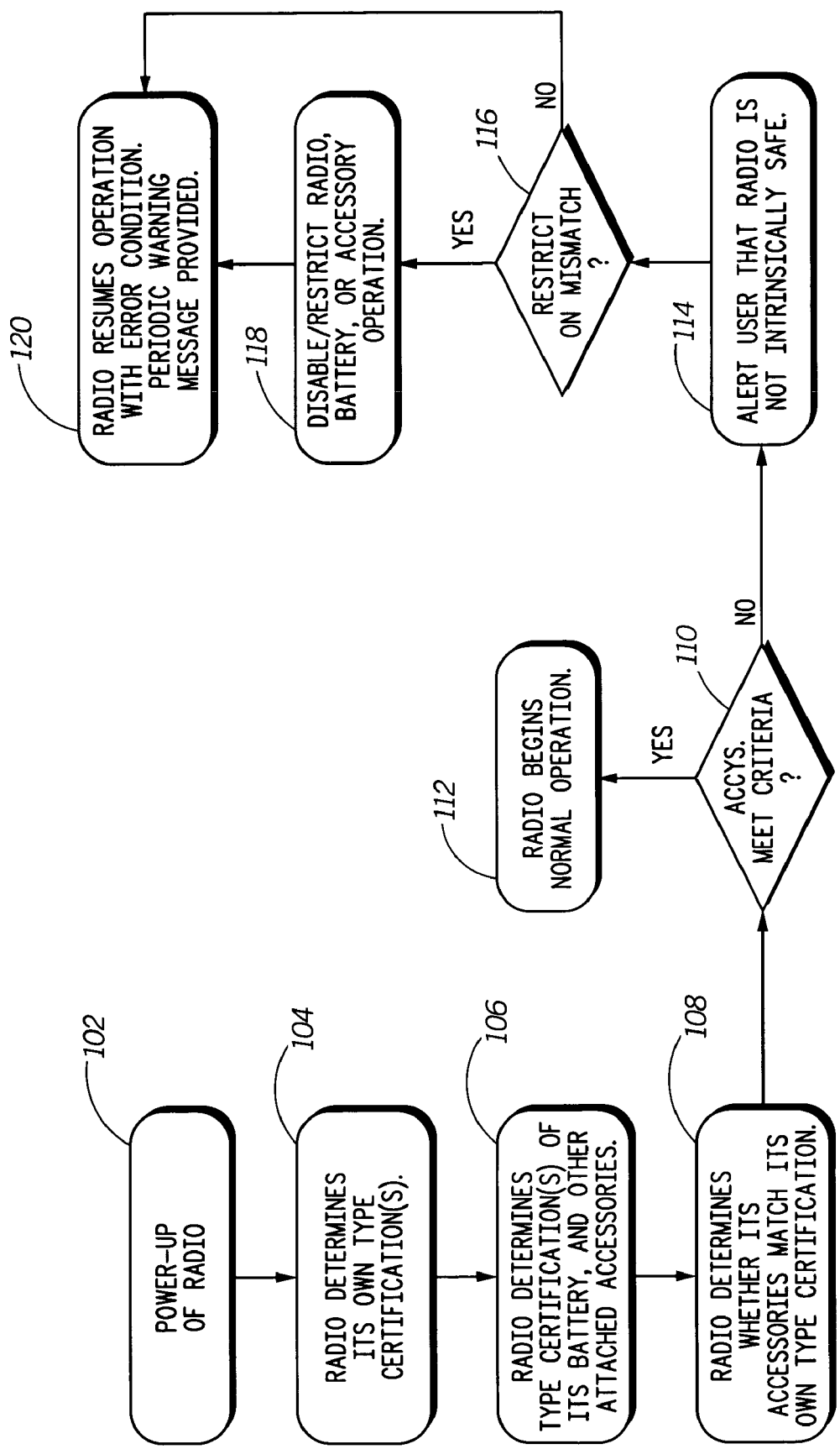
FIG. 1 is a flow chart depicting a method to ensure intrinsically safe operation of a communication device in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein an automated means to ensure communication device users in hazardous environments have a properly equipped device, including batteries and accessories coupled thereto. For the purposes of this application, batteries, accessories, and other attachable/removable devices will all be referred to as peripheral devices.

In accordance with the present invention, type certifications are stored within a communication device and peripheral devices that are to be coupled thereto. The communication device sends out a warning and restricts the operation of the peripheral device or the radio when the type certification parameters are incompatible.

Figure 2:
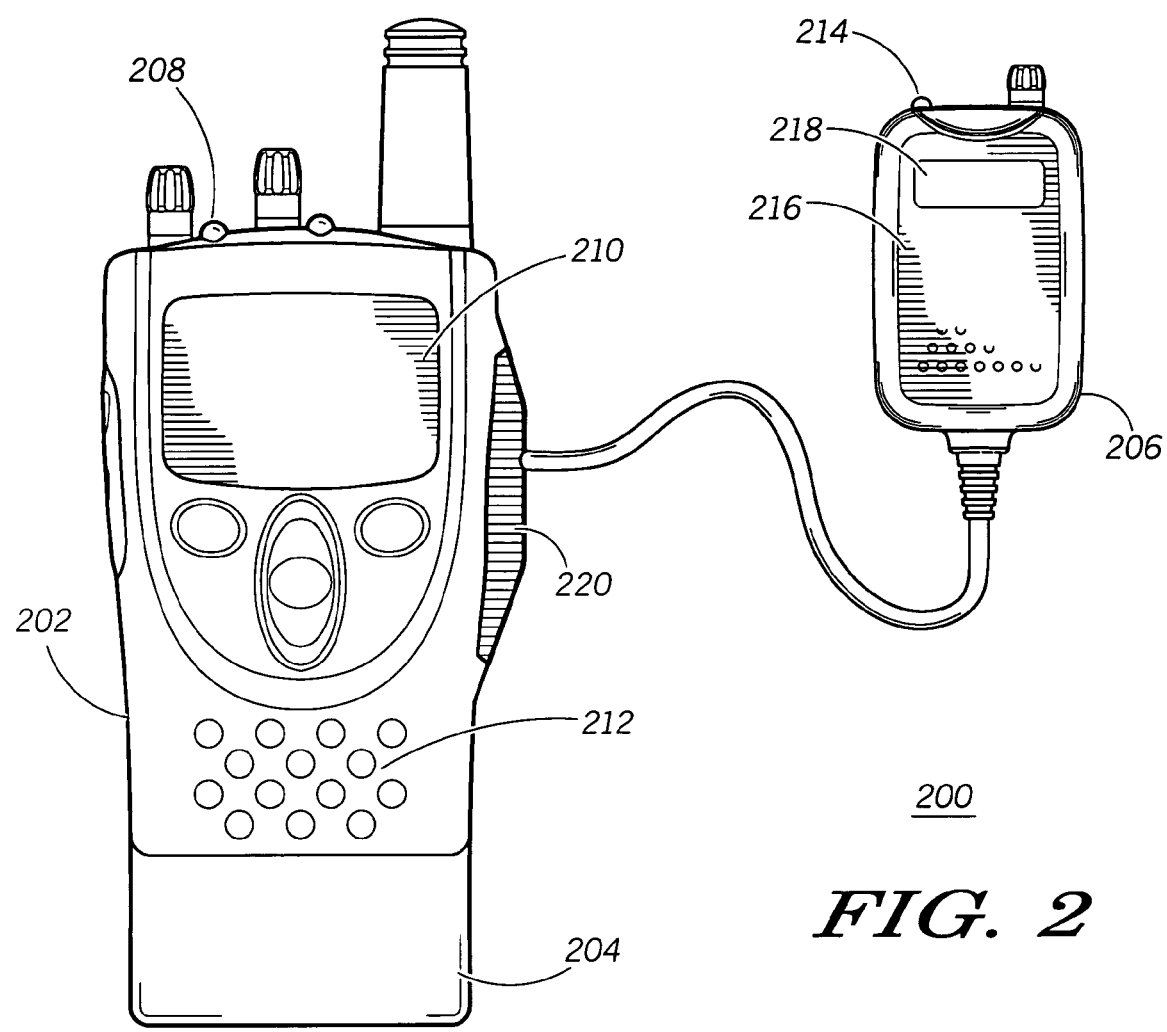
FIG. 2 is a communication system operating in accordance with the method of FIG. 1.

The intrinsically safe communication system of the present invention will be described in terms of FIGS. 1 and 2 of the accompanying drawings. FIG. 1 is a flow chart depicting a method 100 to ensure intrinsically safe operation of a communication device, such as a radio 202 shown in FIG. 2, and peripheral (s), such as a battery 204 and remote speaker microphone 206. Radio battery 204 contains a non-volatile memory device (not shown) which contains battery information including charging information, low battery thresholds, manufacturing information etc. In accordance with the present invention, the battery information is extended to include one or more type certification identifiers, each of which corresponds to a type certification. For example, an FM certified battery would contain an FM identifier. The identifier may also provide additional detail regarding various sub-categories or extensions of a specific certification. For example, an ATEX certified battery may also be rated for pressurization or powder filling and would thus have additional identifiers specifying the additional ratings. Those skilled in the art will recognize that multiple identifiers can be combined into a single, more complex identifier if so desired. Similar to radio battery 204, accessory 206 contains a memory device that contains descriptive information pertaining to the type certification information about the accessory.

The method 100 commences with the step of powering up the radio at step 102, and determining radio type certifications at step 104. The radio 202 can determine its type certifications itself by reading certification parameters stored within the radio. Such parameters in the radio are typically non-alterable and are configured at the time of manufacturing. Next, at step 106, the radio determines the type verification(s) of the battery 204 and other attached accessories 206. At step 108, the radio 202 determines whether the battery 204 and accessories, such as a microphone, 206 match their respective type certification. An exact match is not necessarily required: the battery and/or any attached accessory may exceed the type certification of a particular radio. Additionally, it may be desirable to permit "cross matching" of different certifications if allowed by regulatory agencies. Regardless of the exact matching logic, step 110 ensures that a valid configuration to ensure intrinsically safe operation is present for a given radio in a given market. If the certification criteria are met at step 110, then the radio begins normal operation at step 112. If the type certification criteria are not met at step 110, then the user is alerted that the radio is not intrinsically safe in step 114. This alert could be an audible tone alert through speaker 212 or a visual alert such as blinking LEDs 208 and 214, but a specific warning such as a message displayed on LCD screen 210 or a voice prompt alert from speaker 212 or 216 is preferred to ensure the user understands the nature of the error condition.

At step 116, the radio checks its internal configuration data such as the radio codeplug to determine whether restrictions are required in the error condition. This option provides the manufacturer or radio programmer flexibility in determining how to handle the error condition. Some users may choose to permit radio operation during the error condition while others may choose to restrict it. The radio manufacturer may also choose to eliminate decision step 116 for a particular product and pre-determine whether restrictions are provided or not-provided.

If the radio's codeplug specifies there are no restrictions in step 116, then the radio resumes operation under an error condition in step 120. This is in contrast to step 112, where the radio is in normal operation without an error condition. Step 120 includes the use of periodic warning messages or alerts intended to remind the user that the current configuration is not type certified and is potentially not intrinsically safe. The periodic warning message may also serve to warn another user of the same radio who did not receive the detailed warning in step 114.

If the radio's codeplug specifies there are restrictions in step 116, then the radio implements the restrictions in step 118. These restrictions can be fixed, or they can be specified in the radio codeplug. The restrictions can vary depending on the type certification mismatch and can also vary based on the type of peripheral device; that is, the restrictions can be contextually sensitive. For example, if the battery 204 does not match the radio 202, the radio has little choice of restriction other than to significantly impair its own functionality since the battery is required for the radio to operate. The radio can power itself down or it can limit operation to receive only. As another example, if the battery 204 matches the radio 202 but the accessory 206 does not match, the radio can restrict the operation of accessory 206. The radio can accomplish this by disabling interface 220 to accessory 206 thereby making accessory 206 non-powered and non-functional, while still allowing primary functionality of the radio. The impairment to safety provided by non-certified accessory 206 in this example has thus been temporarily suspended. This is in contrast to the previous example where the radio remained unsafe prompting more severe operational restrictions. Since a portable radio is often a vital safety tool, those skilled in the art will appreciate the flexibility afforded by varying the restriction(s) based on the context of mismatch.

As previously stated, at step 120 the radio may be restricted to the point of being completely disabled. Alternate restrictions can include but are not limited to, low power transmit, no transmit, limited accessory connector current, or disabling of the accessory connector entirely.

The error condition may take on many forms including audible, visual, and physical. For example, a warning tone through speaker 212, a flashing LED 208, a message on display 210, or vibration to provide notification to the user of the unsafe condition. If the accessory 206 is operating in some capacity, then the error condition can also be indicated on the accessory side at LED 214, speaker 216, and/or display 218. Additionally, the radio 202 may report overall type certification status over-the-air to a system operator if desired.

Accordingly, there has been provided an intrinsically safe communication system that enhances user safety by alerting a user to an improper configuration. The intrinsically safe system of the present invention can restrict or modify communication device operation and peripheral device operation as a safety measure. Since the method of the present invention can be implemented in software and the type certification stored in memory, no additional direct material for the system is required.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An operating system, comprising:
    a communication device having communication device type certification parameters stored therein;
    a peripheral device that attaches to the communication device, the peripheral device having peripheral device type certification parameters stored therein, the communication device type certification parameters and the peripheral device type certification parameters comprising intrinsic safety information; and
    the communication device restricting the level of operation of the peripheral device when the communication device type certification parameters and peripheral device type certification parameters are intrinsically incompatible, based solely on a reading initiated by the communication device, to provide an intrinsically safe operating system.

2. The intrinsically safe operating system as described in claim 1, wherein the peripheral device is processor-less as regards to the intrinsically safe operating system.

3. A method of operating a communication system, comprising the steps of:
    storing communication device type certification parameters within a communication device;
    storing peripheral type certification parameters within a peripheral device the communication device type certification parameters and the neripheral type certification parameters comprising intrinsic safety information:
    coupling the periphersi device to the communication device; and
    initiating a read at the radio communication device to determine whether the peripheral device is intrinsically compatible with the communication device based on the communication device type certification parameters and the peripheral type certification parameters to provide an intrinsically safe communication system.

4. The method of claim 3, wherein the communication device is a handheld communication device.

5. The method of claim 3, wherein the peripheral device comprises an accessory.

6. The method of claim 3, wherein the peripheral device comprises a battery.

7. The method of claim 3, wherein the peripheral device is processor-less as regards to the intrinsically safe communication system.

8. A method of operating a radio and a peripheral device, comprising:
    storing radio type certification parameters within the radio;
    storing peripheral device type certification parameters within the peripheral device, the radio type certification paraincters and the peripheral device type certification parameters comprising intrinsic safety information;
    comparing, at the radio, the radio type certification parameters and peripheral type certification parameters;
    determining, solely at the radio, intrinsically safe compatibility based on the step of comparing;
    varying the level of operation of the radio and the peripheral device based on the intrinsically safe compatibility to ensure intrinsically safe operation of the radio in conjunction with the peripheral device; and indicating intrinsically safe incompatibility.

9. The method of claim 8, wherein indicating comprises sending a visual alert to a user.

10. The method of claim 8, wherein indicating comprises sending an audible alert to the user.

11. The method of claim 8, wherein indicating comprises sending a physical alert to the user.

12. The method of claim 8, wherein the peripheral device is processor-less as regards to the intrinsically safe operation of the radio and the peripheral device.

13. An operating system, comprising:

a communication device having communication device type certification parameters stored therein;

a plurality of peripheral devices that attach to the communication device, the plurality of peripheral devices each having peripheral device type certification parameters stored therein, the communication device type certification parameters and the peripheral device type certification parameters comprising intrinsic safety information; and the communication device restricting the plurality of peripheral devices to various predetermined levels of operation in response to the communication device type certification parameters and the peripheral device type certification parameters being mismatched as determined solely by the communication device to provide an intrinsically safe operating system, wherein the various predetermined levels of operation are restricted based on the context of the mismatch.

14. The intrinsically safe operating system of claim 13, wherein the plurality of peripheral devices includes a battery and accessories coupled to the communication device.

15. The operating system as described in claim 13, wherein the plurality of peripheral devices are processor-less as regards to the intrinsically safe operating system.

16. A method of operating a communication system, comprising the steps of:

storing communication device type certification parameters within a communication device;

storing peripheral type certification parameters within a plurality of peripheral devices;

coupling the plurality of peripheral devices to the communication device;

determining, solely within the communication device, whether the plurality of peripheral devices are intrinsically compatible with the communication device based on the communication device type certification parameters and each of the peripheral type certification parameters; and selectively restricting, solely by the communication device the operation of the plurality of peripheral devices to predetermined levels based on intrinsic compatibility in order to provide an intrinsically safe communication system.

17. The method of claim 16, wherein the plurality of peripheral devices includes a battery and accessories coupled to the communication device.

18. The method of claim 16, wherein the plurality of peripheral devices are processor-less as regards to the intrinsically safe communication system.

* * * * *